United States Patent [19]
Chou

[11] Patent Number: 6,167,136
[45] Date of Patent: Dec. 26, 2000

[54] METHOD FOR PREVENTING COPYING OF DIGITAL VIDEO DISKS

[75] Inventor: Wayne W. Chou, Ridgefield, Conn.

[73] Assignee: Software Security, Inc., Darien, Conn.

[21] Appl. No.: 08/857,243

[22] Filed: May 16, 1997

[51] Int. Cl.[7] .................................................. H04L 9/00
[52] U.S. Cl. ..................... 380/201; 380/200; 380/202; 380/203; 380/239; 380/277; 380/278; 380/210; 380/217; 713/193
[58] Field of Search ................................ 380/4, 5, 9, 10, 380/43, 49, 50, 46, 3, 200–210, 216, 217, 236–239, 252, 255, 277, 278, 287; 360/60; 713/189, 193, 194, 200

[56] References Cited

U.S. PATENT DOCUMENTS

| | | | |
|---|---|---|---|
| 4,827,584 | 5/1989 | Shear | 380/4 |
| 4,977,594 | 12/1990 | Shear | 380/4 |
| 5,050,213 | 9/1991 | Shear | 380/25 |
| 5,113,518 | 5/1992 | Durst, Jr. et al. . | |
| 5,274,623 | 12/1993 | Usami et al. . | |
| 5,337,357 | 8/1994 | Chou et al. . | |
| 5,341,429 | 8/1994 | Stringer et al. | 380/23 |
| 5,410,598 | 4/1995 | Shear | 380/4 |
| 5,416,840 | 5/1995 | Cane et al. | 380/4 |
| 5,473,840 | 12/1995 | Oshima . | |
| 5,479,729 | 1/1996 | Eslambolchi . | |
| 5,490,216 | 2/1996 | Richardson, III | 380/4 |
| 5,509,070 | 4/1996 | Schull | 380/4 |
| 5,513,260 | 4/1996 | Ryan | 380/3 |
| 5,538,773 | 7/1996 | Kondo . | |
| 5,548,645 | 8/1996 | Ananda | 380/4 |
| 5,563,947 | 10/1996 | Kikinis | 380/4 |
| 5,572,507 | 11/1996 | Ozaki et al. . | |
| 5,588,137 | 12/1996 | Yoneda et al. . | |
| 5,596,639 | 1/1997 | Kikinis | 380/4 |
| 5,608,387 | 3/1997 | Davies . | |
| 5,629,980 | 5/1997 | Stefik et al. | 380/4 |
| 5,634,012 | 5/1997 | Stefik et al. . | |
| 5,809,139 | 9/1998 | Girod et al. | 380/5 |

*Primary Examiner*—Bernarr E. Gregory
*Attorney, Agent, or Firm*—Pollock, Vande Sande & Amernick, R.L.L.P.

[57] ABSTRACT

A method for securely storing analog or digital data on a data storage medium. An analog information signal is combined with a noise signal. The composite noise and information signal is encrypted with a key which is derived from the noise signal. The encrypted composite signal is compressed and then recorded on the data storage medium along with an encrypted value of the key. The storage medium data is read, decompressed, and decrypted using a decryption key derived from the stored encrypted key. The data is then converted to an analog signal and combined with a noise correction signal derived from said key to eliminate the noise signal added to the analog information signal before storing the signal on the data storage medium.

15 Claims, 10 Drawing Sheets

METHOD FOR PREVENTING COPYING OF DIGITAL VIDEO DISKS

BACKGROUND OF THE INVENTION

The present invention relates to a method for creating digital video disks which are not susceptible to copying. Specifically, a system for creating mass copies of digital video disks is described from which commercially acceptable copies may not be made.

The explosion of digital data technology has produced a demand for mass marketed data mediums in the form of optical disks and magnetic tapes which include audio and video records, which are played on CD players and audio tape players. Digital video disks have stored thereon an optically encoded digital file of a video work including the program material divided into frames which is replayed by the user.

The illicit copying of such digital video disks is a significant problem for copyright owners. As one solution to this dilemma, it is possible to encrypt the digital data before recording the data on a digital master data recording which is used to make copies on a large scale. Even though the original master data recording is maintained secret, it is possible, sooner or later, using brute force techniques to discover a universal key needed to decrypt the data.

In the related field of maintaining computer software secret various techniques have been developed for protecting the software against unauthorized use. One common solution used to frustrate the unauthorized use and copying of computer software includes the provision of a hardware device mounted to the port of computer which executes the software. Unless the external hardware is present, a copy of the software is useless as execution will halt without the corresponding hardware device connected to the computer.

CD players and audio tape players, however, generally do not have the ability to provide such hardware security. The adaptation of these techniques to the protection of mass produced and distributed audio and video disks requires that a hardware device be provided for supplying keys to decrypt any encrypted data on the recorded mediums. To the extent that the discovery of the keys can be maintained secret, commercial copying of the works becomes unprofitable.

SUMMARY OF THE INVENTION

It is an object of this invention to store data on a data medium in a form which cannot be copied for commercial purposes.

It is a more specific object of this invention to encrypt a source of analog information which when decrypted cannot be used to manufacture illicit copies.

In accordance with the invention, a digital video disk recording and reproducing technique is described for securing recorded information against copying. In carrying out the invention, a signal containing an analog video signal is generated and combined with a sampled noise signal. The combined signal is converted to digital data where it is then encrypted and stored on a digital video disk record on a frame-by-frame basis. The encryption process uses a key generated from the sample of noise signal which was combined with the original video data. The key derived from the sampled noise is further encrypted with a encryption key $K_X$ specific to the digital video disk. The frames of encrypted data are stored on the digital video record along with a header containing the encrypted noise key as well as a frame identification number.

The digital video record is read by a video disk reader on a frame-by-frame basis. The encrypted key as well as frame number stored within the header, representing the information necessary to decrypt the following encrypted frame data, are decoded from the frame header.

In accordance with a preferred embodiment, the encrypted noise key and frame number may be combined in a deciphering engine to derive the original noise key which is used to decrypt the encrypted data. Further, the sampled noise is derived from the noise key and subtracted from the decrypted data to derive a substantially noise free video signal. The cancellation of the noise from the decrypted data is done a partial basis so that the noise cancellation is incomplete. The output of the digital video disk is suitable for viewing and can be copied by ordinary VCR's. However the uncancelled noise in the video signal is not of sufficient quality to permit commercially acceptable copies to be made discouraging the mass copying of the disk.

DESCRIPTION OF THE PREFERRED EMBODIMENT

Figure 1:
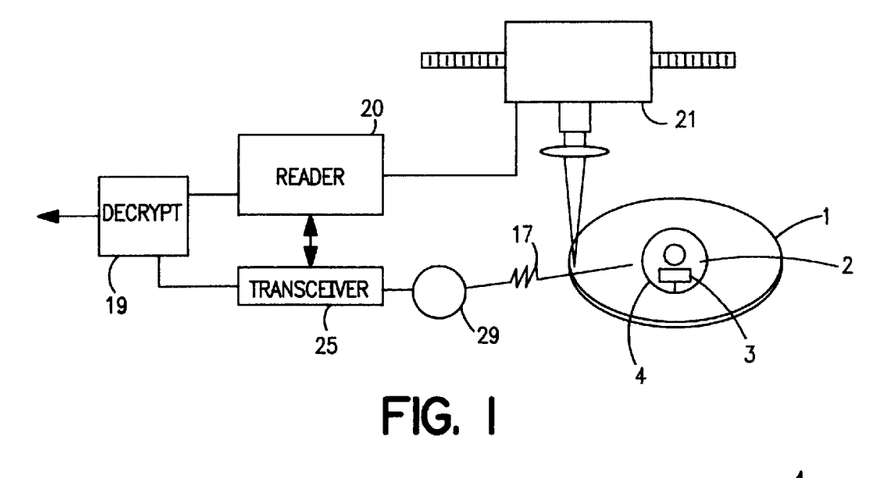
FIG. 1 illustrates a ODC 1 having a self-contained transponder for calculating a decryption key.
Figure 2:
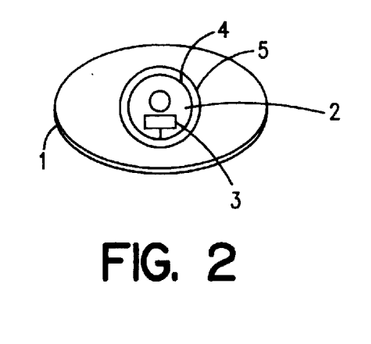
FIG. 2 is another implementation of a ODC 1 having a transponder fixed to a label on the ODC 1 for calculating a decryption key.
Figure 3:
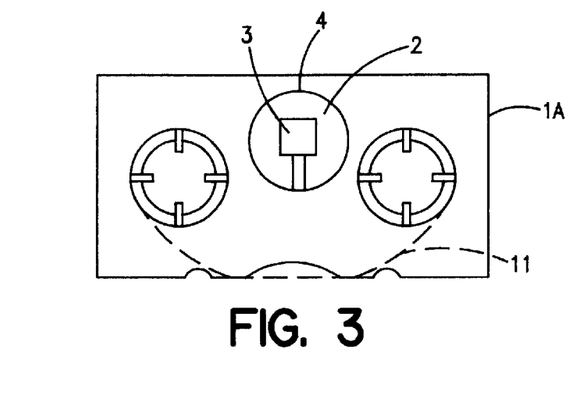
FIG. 3 shows an audio cassette 1 having a transponder 2 which calculates a decryption key.

FIG. 1 illustrates an optical disk carrier (ODC) 1 which may be a DVD, audio CD or CD-ROM which is read by an optical scanning head 21. The optical disk data carrier 1 includes a transponder 2 fixed to the disk carrier 1 having a transponder microelectronic chip 3 connected to an antenna 4. The transponder 2 is either embedded within the body of the disk or attached thereto with conventional adhesive. FIG. 2 illustrates another embodiment of a optical disk carrier 1 having a stick-on label 5 containing the microelectronic chip 3 and antenna 4. FIG. 3 illustrates the same transponder 2 fixed to a magnetic cassette tape 1A in a similar manner. The transponder microcircuit 3 is inductively powered from a magnetic or electrical field generated by the reader 20.

The ODC 1 of FIG. 1 is read with optical scanning head 21 which directs a coherent optical beam to the surface of the ODC 1. Reflections from the surface of the ODC 1 are converted into digital data by the optical scanning head 21. As will be evident from a detailed description of the data format recommended for the ODC 1, the reader 20 will recover header information associated with each frame of encrypted data stored on the ODC 1 including a frame identification number. A transceiver 25 communicates with the transponder 2 through either an electrostatic or electromagnetic bi-directional link 17. As the distances are small, the required transmission channel power is very low. Further, the reader 20 and its associated transceiver 25 generate a magnetic field which is used to transmit operational power to the transponder 2.

The encrypted data is read from the ODC 1 on a frame-by-frame basis. The reader 20 identifies a frame number within the header of each read frame which may be either a consecutive number from a frame numbering system, or may be a random number unique to a specific frame. The read frame number is transferred to a transceiver 25.

Transceiver 25 communicates via a bi-directional link 17 to the transponder 2. The transponder 2 includes a deciphering engine 10 that implements a decryption algorithm D to be used in deriving the frame decryption key FDK. The decryption algorithm D can be any block ciphering algorithm, such as DES, Feal, KeeLoq, etc. The frame decryption key FDK is derived by decrypting the frame number using the algorithm D and secret deciphering key $DK_A$ internally stored in transponder 2. The transponder 2 transmits the decryption key FDK via the bi-directional link 17 to the transceiver 25. The frame decryption key FDK is used in a decryption circuit 19 to decrypt the encrypted frame data which follows the frame header.

Thus, the foregoing implementation provides, along with a data medium, a transponder 2 which is necessary to decrypt each frame of data stored thereon. The ODC 1 cannot be duplicated and later read and decrypted without the transponder 2. As will be evident when describing the details of transponder 2, the stored information necessary for calculating the decryption key FDK may not be read from the transponder 2. Thus, while it may be possible to reproduce the stored data 1, without a corresponding transponder 2 having the secret information embedded therein for deriving a decryption key FDK, the duplicated ODC 1 is useless.

Figure 4:
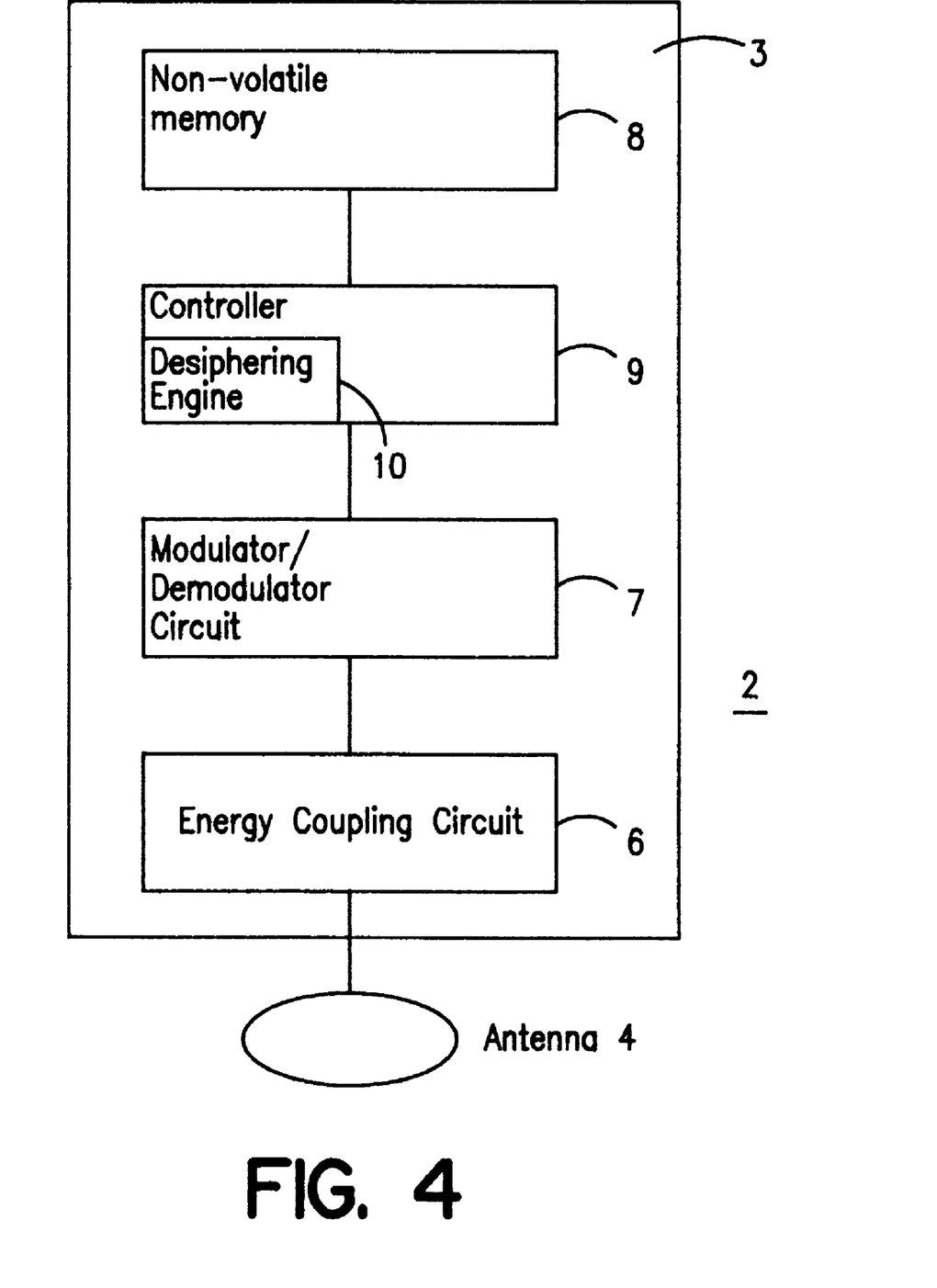
FIG. 4 is a block diagram of transponder 2 which determines a decryption key from information received from the reader.

FIG. 4 is a block diagram of the transponder 2. The transponder 2 comprises a microcircuit 3, which includes a controller 9 having a deciphering engine 10. A non-volatile memory 8 stores secret deciphering key $DK_A$ which is unique for any particular ODC title, as well as an algorithm used by deciphering engine 10 to combine the deciphering key with the received frame number. The non-volatile memory 8 is configured such that its contents may not be read from the non-volatile memory 8, thereby maintaining secrecy and avoiding an illicit decryption of ODC 1.

An energy coupling circuit 6 is shown which couples electromagnetic energy from the reader 20 to the microchip 3 of the transponder 2. The transponder 2 is based on the known RF ID systems, such as the commercially available transponder HCS 410 manufactured by Microchip Technology, Inc. These systems have been implemented in so called identity: "friend or foe" (IFF) systems. The transponder 2 issues a given a response when a given input information is received based on the secret deciphering key stored inside it.

The energy coupling circuit 6 inductively couples a.c. current from an a.c. magnetic field produced from the reader 20. The a.c. current is then rectified by the coupling circuit 6 to produce d.c. operating voltage for the deciphering engine 10, non-volatile memory 8, and modulator/demodulator 7. The modulator/demodulator 7 generates a modulated carrier for transmission to the reader transceiver 25, as well as demodulates transmissions received from transceiver 25.

The deciphering engine 10 is based on a set of executable instructions retrieved from the non-volatile memory 8. The deciphering engine 10 is configured from the instructions set executed by an internal processor of microcircuit 3. For each frame number received via the bi-directional channel 17, the deciphering engine 10 reads key $DK_A$ from memory 8, and combines $DK_A$ with the frame number in a secret algorithm stored in non-volatile memory 8 to generate the frame decryption key:

$FDK_i=D(DK_A,i)$.

The calculated decryption key $FDK_i$ is transmitted via the modulator/demodulator circuit 7 and antenna 4 to the transceiver 25 of the reader 20.

Figure 5A:
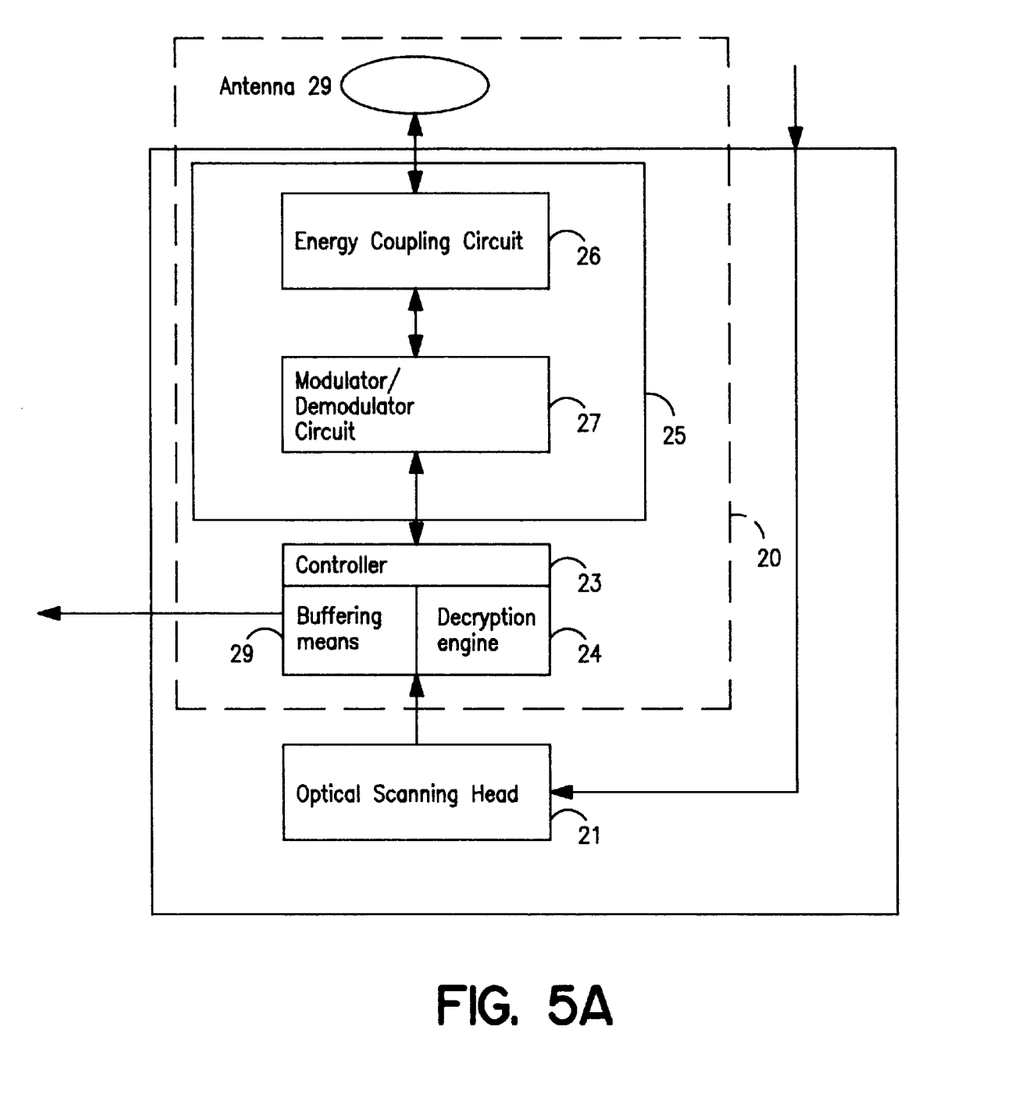
FIG. 5A illustrates a reader for reading and decrypting information contained on a data medium.

FIG. 5A illustrates a more detailed block diagram of the reader circuit 20 for reading the encrypted frame data and decrypting the frame data with the decryption key $FDK_i$ received from the transponder 2. The transceiver 25 is shown to include an energy coupling circuit 26 which provides the electromagnetic field via antenna 29 to the transponder 2. The energy coupling circuit 26 generates the alternating field sufficiently large to create the operating power for the transponder 2 which is only located a matter of inches away. Demodulator/modulator circuit 27 provides for communication over the bi-directional link 17 through either a magnetic communication or electromagnetic, or radio frequency communication via antenna 29 depending on the particular microcircuit 3 used for transponder 2.

The controller 23 is shown which is a function of the internal microprocessor of the transponder 2 which is programmed to provide the decryption engine 24 with the decrypting key $FDK_i$ received from the transponder 2 via the bi-directional link 17. A buffering means 29 under control of controller 23 stores each frame of data, including the header associated with the frame, which is received from the optical scanning head 21.

The invention may also be implemented so that decryption takes place inside the reproduction device or a computer. For this purpose, the decryption key $FDK_i$ and the encrypted data $EC_i$ from the controller 23 are transferred to the reproduction device or a computer where the data is then decrypted.

The decrypted data $PC_i$ produced by the buffering means 29 can then be utilized by either a digital computer, digital video disk player, or other digital playback means. It is, of course, possible to copy the decrypted data which is transferred at this point, which may therefore constitute a source of illicit copying.

Figure 5B:
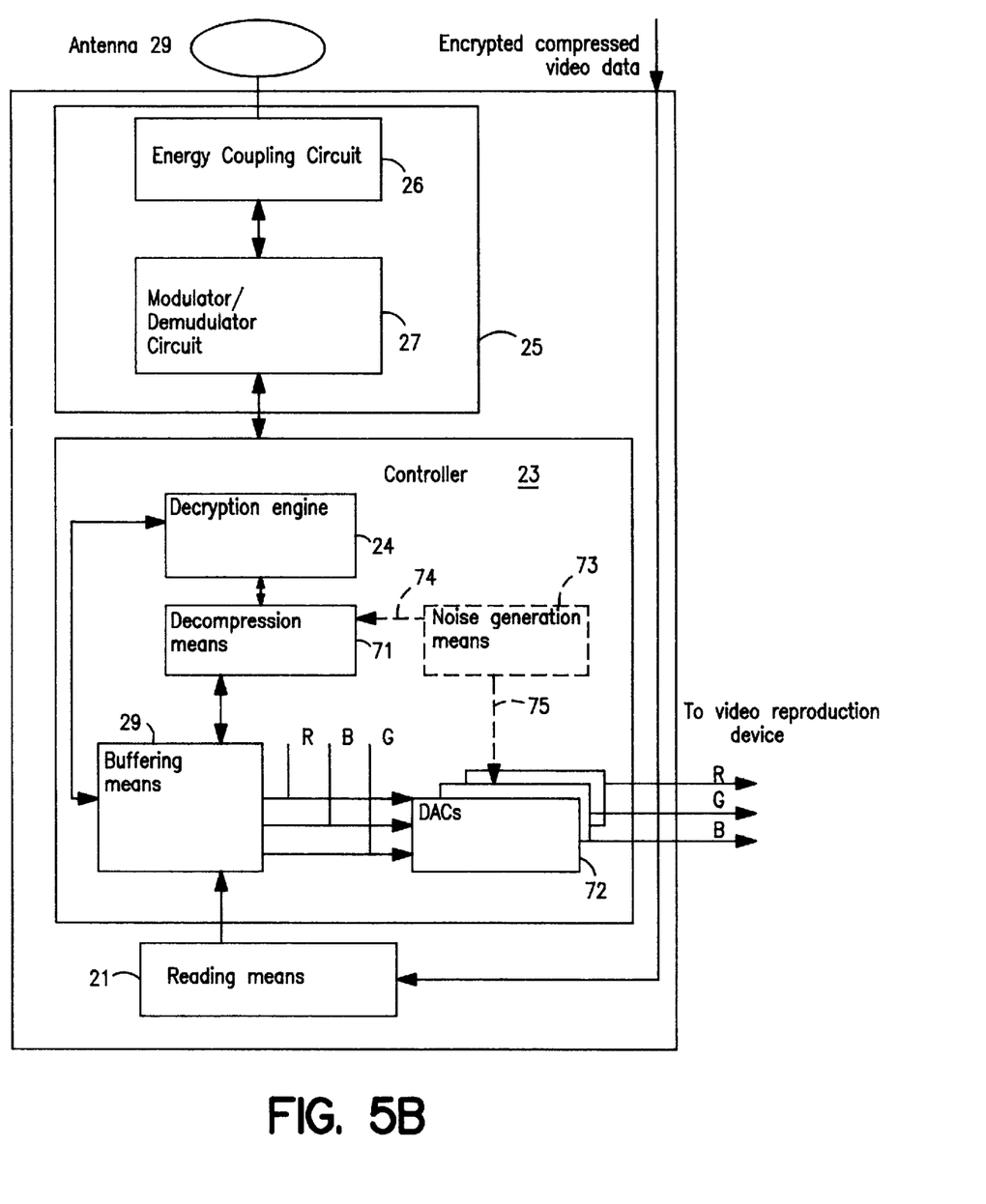
FIG. 5B illustrates a reader for reading and decrypting information contained on a data medium which had been previously compressed.

As an aid to frustrating copying of the decrypted data, FIG. 5B illustrates an implementation of the present invention which would further discourage such copying. Referring now to FIG. 5B, there is shown a decompression means 71. The implementation of FIG. 5B envisions that the data would be compressed using a standard compression technique, such as MPEG-2, prior to the data encryption and storing on the ODC 1.

During the process of decrypting the stored data by decryption engine 24, a decompression of the data would occur following decryption by the decompression circuit 71. It should be noted that the decompression circuit could be additional software instructions contained in controller 23, or may in fact be a separate hardware device. The decompression is effected on the stored data in buffer 29. The decompressed frames of data are accumulated in the buffer 29, and are then converted in FIG. 5B by digital analog converters 72 into analog video signals R, G and B.

In most cases, the compression/decompression process is not lossless, in that each time a compression and decompression occurs, the quality of the signal degrades. This degradation, although not objectionable on the first copy being made from the R, G and B reproduced analog signals, would be further degraded if an attempt to create a master of the recording was attempted. The subsequent data compression necessary to create a master disk for creating large numbers of copies would significantly degrade image quality to render them commercially unappealing.

In the event that the degradation of data quality from compression/decompression is not sufficient, a noise generator 73 may be implemented for adding digital pseudo random weak noise to the inputs of the digital to analog converters 72, which will slightly corrupt the image reducing its quality. The noise degraded signal, while not being unobjectionable for making a single copy, or directly viewing the image on a video screen, would, however, produce an inferior master for making additional copies. The dashed lines 74 and 75 of FIG. 5B indicate that the noise may be added either to the decompression circuit 71, or, may in fact, be applied as an analog signal to each of the R, G and B video signals.

Figure 6:
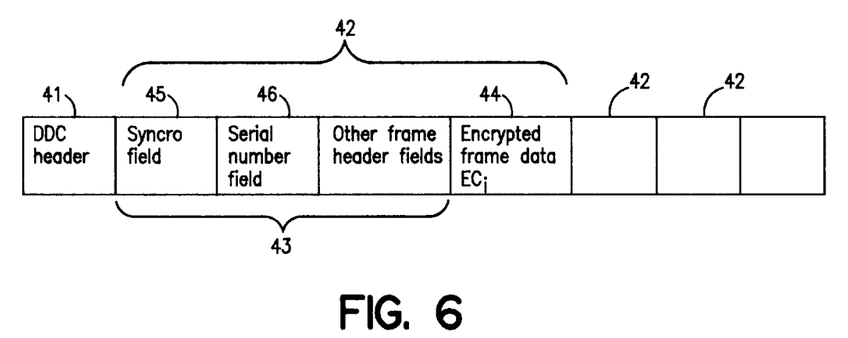
FIG. 6 illustrates a frame header for each frame of encrypted data contained on the data medium.

The structure of the frame header which precedes every frame recorded on the data media is shown more particularly in FIG. 6. Referring now to FIG. 6, the arrangement of the data stored on media 1 is shown to include a DDC header 41 preceding multiple frames of data 42. Each frame of data 42 includes a frame header 43. The length of each frame 42, including the header 43, is selected based on the capacity of the buffering means 29 to store the complete frame. The data contained in the frame 42 is encrypted in accordance with a encryption technique to be described in detail with respect to FIG. 8. One of the fields within the frame header 43 is serial number field 46. The serial number field 46 contains a number representing the particular frame associated with the frame header 43. The first field of the frame header 45 contains the special synchronization data that permits location of the beginning of the frame by optical scanning head 21 starting from any place on the data media. Thus, each frame may be individually accessed, and not necessarily in order. The encrypted data 44 may also be compressed, as is known to those skilled in efficiently recording data.

Figure 7:
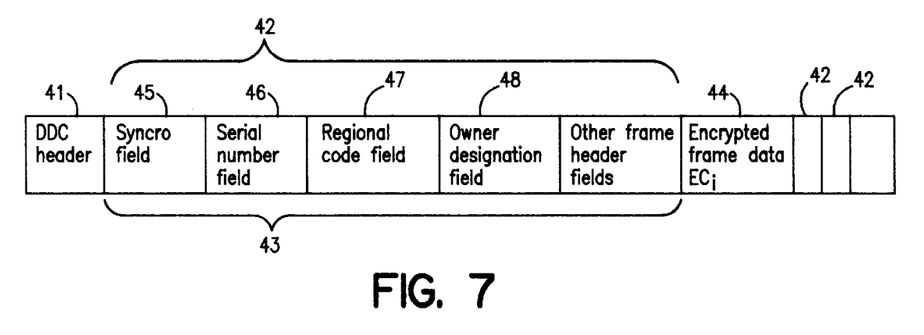
FIG. 7 illustrates another frame header for each frame of encrypted data contained on the data medium.

The above system for maintaining stored data secure against unauthorized use can be adapted to protect digital video disk recordings. In these recordings, regional codes can be entered into a field of each frame of the encrypted data. The regional codes insure that first run movies released to movie theaters do not face competition from a version which was recorded on digital video disk for home use. The regional codes are set up such that digital video disks released in designated world regions can not be read by a reader 20 sold in any other region due to the presence of the regional code. Referring to FIG. 7, the foregoing feature can be provided by including within the header 43 of the frame 42 additional fields 47 and 48. The regional code field 47 contains a regional code identifying the region where the digital video disk may be played. The code in field 47 is assigned to non-copyright protected or home recorded materials. The title identification field 48 identifies the owner of the copyrighted material with a special identification code assigned to the copyrighted material.

During a playback mode, the contents of fields 46–48 are also an input to the deciphering algorithm, along with the frame number in field 46.

Further, the various readers 20 are configured to include a circuit for comparing the regional code contained in field 47 with a locally stored regional code embedded in the reader 20 circuitry. If an attempt is used to play a digital video disk intended for sale in one region, in a reader 20 intended for sale in another region, the circuitry inhibits the read operation.

The foregoing structure of a digital video disk may also be sold as a blank recording medium having a default value $DK_{DEFAULT}$ written in the non-volatile memory 8 of the transponder 2.

Figure 8:
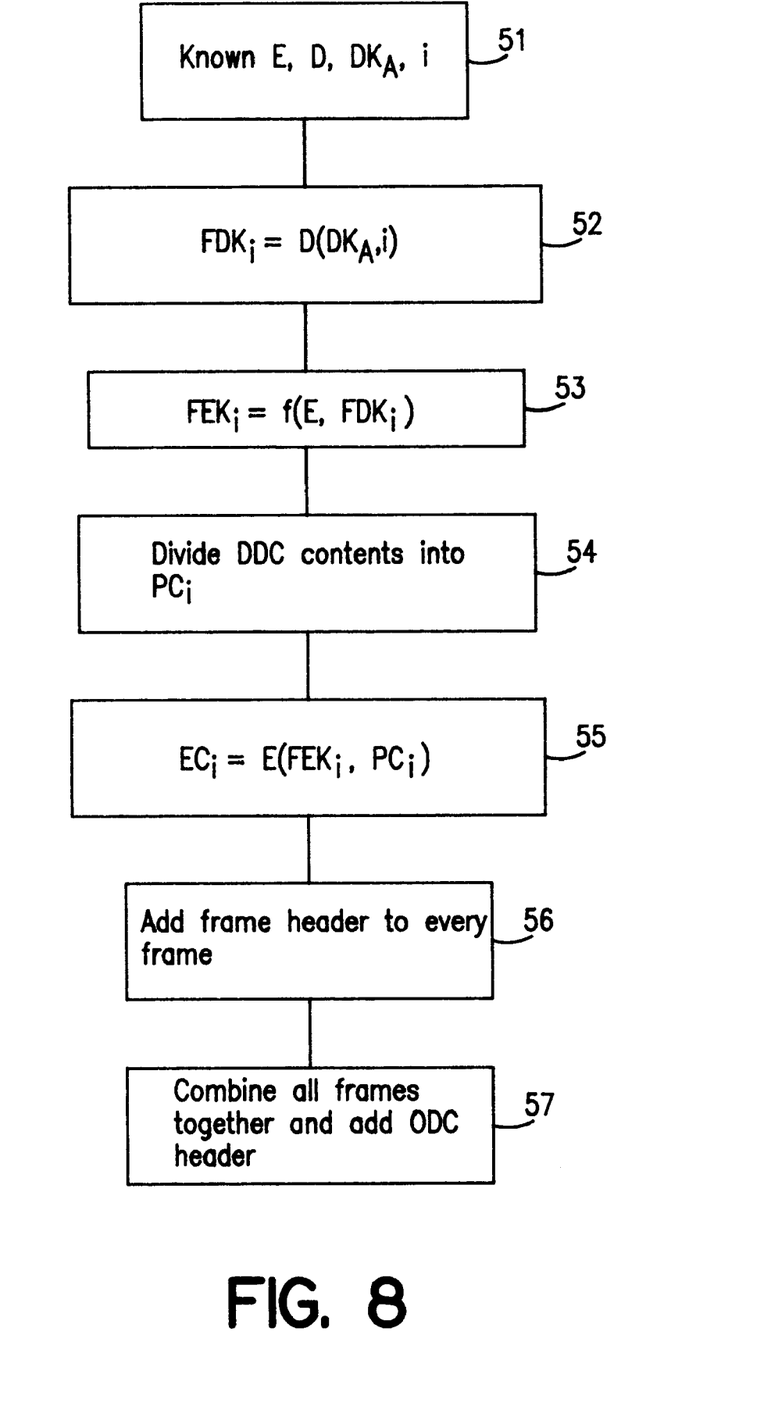
FIG. 8 is a flow chart illustrating how data is encrypted before storing on a data medium.

FIG. 8 illustrates the process for preparing data for storage on a data medium with frames of encrypted data 42 having a format shown in FIG. 6. The plain contents $PC_i$ of each separate frame i should be preliminarily encrypted. The encryption is made using a special encryption algorithm E and the separate precalculated frame encryption key $FEK_i$ for each frame i. The encryption algorithm E has a counterpart: the reverse decryption algorithm U to be used for the decryption of contents of ODC 1 by the decrypting engine 24 inside the ODC reader 20. For each compilation of data A to be stored on a data medium, a separate secret deciphering key $DK_A$ is selected. This value of $DK_A$ will be written in the non-volatile memory 8 of the transponder 2 of the ODC 1 having this particular encrypted data, and used by the transponder 2 to derive a key to decrypt a stored data. There is no means to read the deciphering key $DK_A$ back from the non-volatile memory 8.

The process begins in step 51 by selecting a known encryption algorithm E, with the known reverse algorithm U, and a deciphering algorithm D implemented in the deciphering engine 10 of transponder 2, and deciphering key $DK_A$ chosen for the specific data compilation.

Based on the above information and the known frame number i, the process of calculation of the frame encryption key $FEK_i$ for particular frame i is calculated based on a frame decryption key $FDK_i$ which will be used to decrypt a data from this frame.

An individual decryption key $FDK_i$ is determined for every frame i of data stored on the ODC 1 as a result of the application of the deciphering algorithm D used in the deciphering engine 10 of a transponder 2 with deciphering key $DK_A$, and with the frame serial number i as an input data:

$FDK_i = D(DK_A, i)$.

Based on the encryption/decryption algorithm E/U, the frame encryption key $FEK_i$ is calculated in step 53 from each decryption key $FDK_i$ for each frame i as follows:

$FEK_i = f(E, FDK_i)$.

In many encryption/decryption algorithms, symmetry is provided such that the frame encryption key is equal to the frame decryption key:

$FEK_i = FDK_i$.

The initial compilation of data to be placed on ODC 1 is divided into separate frames $PC_i$ in step 54 where $PC_i$ is the plain contents of the frame i.

Using an encryption algorithm E in step 55, the contents $PC_i$ of every frame i is encrypted differently as $EC_i$. Based on the particular value of the encrypted frame key $FEK_i$:

$EC_i = E(FEK_i, PC_i)$.

The resulting encrypted contents $EC_i$ from frame i are supplied with the frame header in step 56. One of the fields of the frame header, as shown in FIG. 6, includes a frame identification number i which may be a serial number. It is possible to replace the serial number i with any random number which does not affect any of the forgoing encryption and decryption processes.

The encrypted frames $EC_i$ are then combined with the ODC header 41 in step 57 to comprise a recording master for reproducing the encrypted data medium. Copies of the recording master are manufactured and then physically combined with the transponder 2. In the process of manufacturing, the particular secret deciphering key $DK_A$ is written into a transponder 2 of every copy of this particular title. The write operation can be done with the special instructions using the came RF channel and the equipment known in the state of the art. The deciphering key $DK_A$ is stored in the non-volatile memory 8 of the transponder 2 and can not be read from the outside of the transponder 2. There is no need to put specific restrictions on the write key operation because the value of the key $DK_A$ itself is the only ODC producer's secret in the system.

Figure 9:
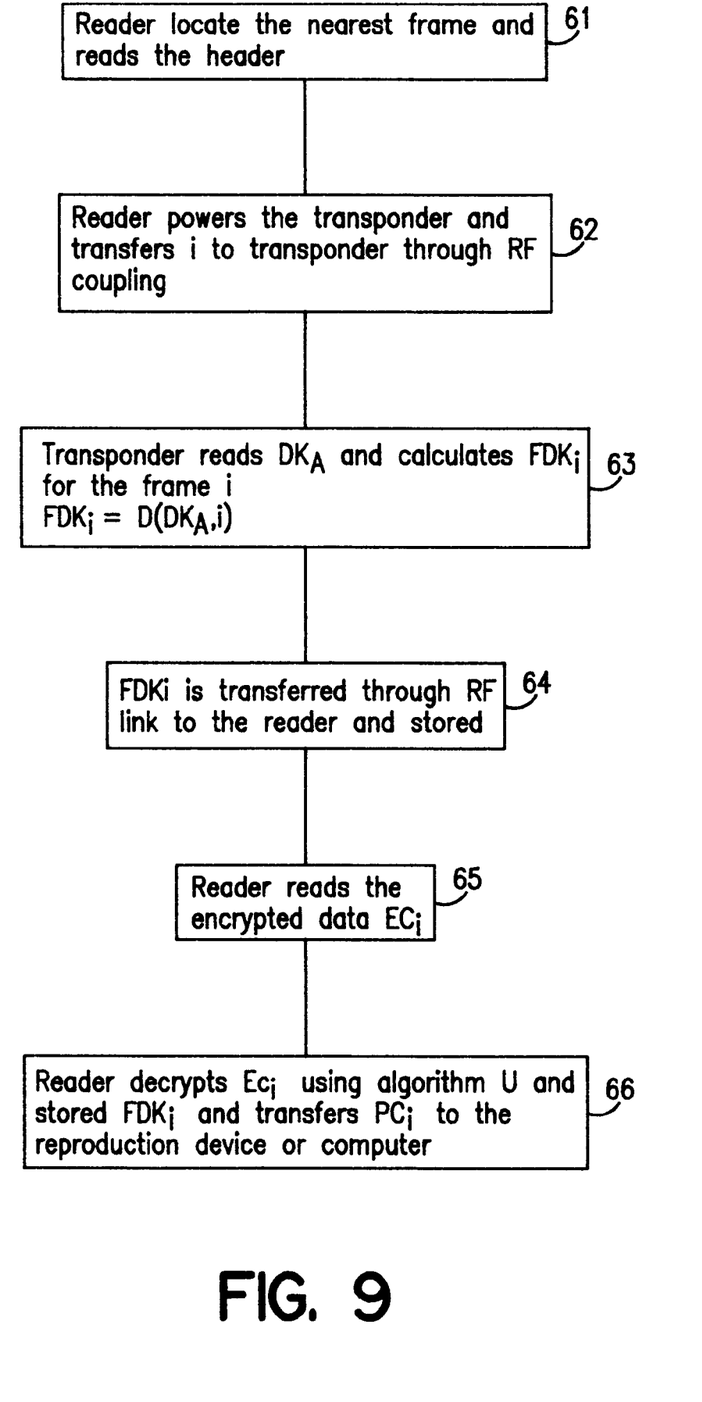
FIG. 9 illustrates the process for recovering and decrypting data from the data medium.

The system operation is summarized in FIG. 9. With the ODC I inserted, a reader 20 finds the desired reading position based on the instructions from the computer. The reader 20 reads the data from the ODC 1 with the optical scanning head 21, locates the nearest frame 42 based on the special synchronization features of the record, and reads its respective header in step 61. The reader 20 also energizes the power generation circuitry and energy coupling device 26 of FIG. 5 providing power to the transponder 2. The electromagnetic energy transferred from reader 20 to the transponder 2, wakes up the microprocessor controller 9 of the transponder 2. The transponder 2 listens for incoming signals from the transceiver 25. Once the transponder 2 and transceiver 25 have communicated over the bi-directional link 17 by exchanging handshake protocol signals, the reader 20 in step 62 transfers the read value of the frame number i as a challenge to transceiver 25 over the bi-directional link 17 to the controller 9 in the transponder 2. When the challenge data is received, the controller 9 reads the value of the deciphering key $DK_A$ from the non-volatile memory 8, and the deciphering engine 10 combines $DK_A$ with frame number i in the deciphering algorithm D. The deciphering algorithm D derives a decryption key $FDK_i$ in step 63. Using the bidirectional link 17, the transponder 2 forwards the decryption key $FDK_i$ for the current frame to the reader 20 as a response to the challenge value comprising the frame number i. The decryption key $FDK_i$ is stored within the decryption engine 24 of FIG. 5. The reader 20 then reads the encrypted data ECi of the frame in step 65. The contents of the frame are decrypted in step 66 using the stored algorithm U and the received frame decryption key $FDK_i$. The remaining frames of the encrypted data medium are then read and the process of FIG. 9 begins again to decrypt the following frame until all frames of the data medium have been read and decrypted.

As an alternative embodiment of the invention, it is possible to set up the frame such that it represents decryption information for a subsequent frame. This provides for a delay to allow the transponder and reader to exchange data before decrypting the frame data.

Figure 10:
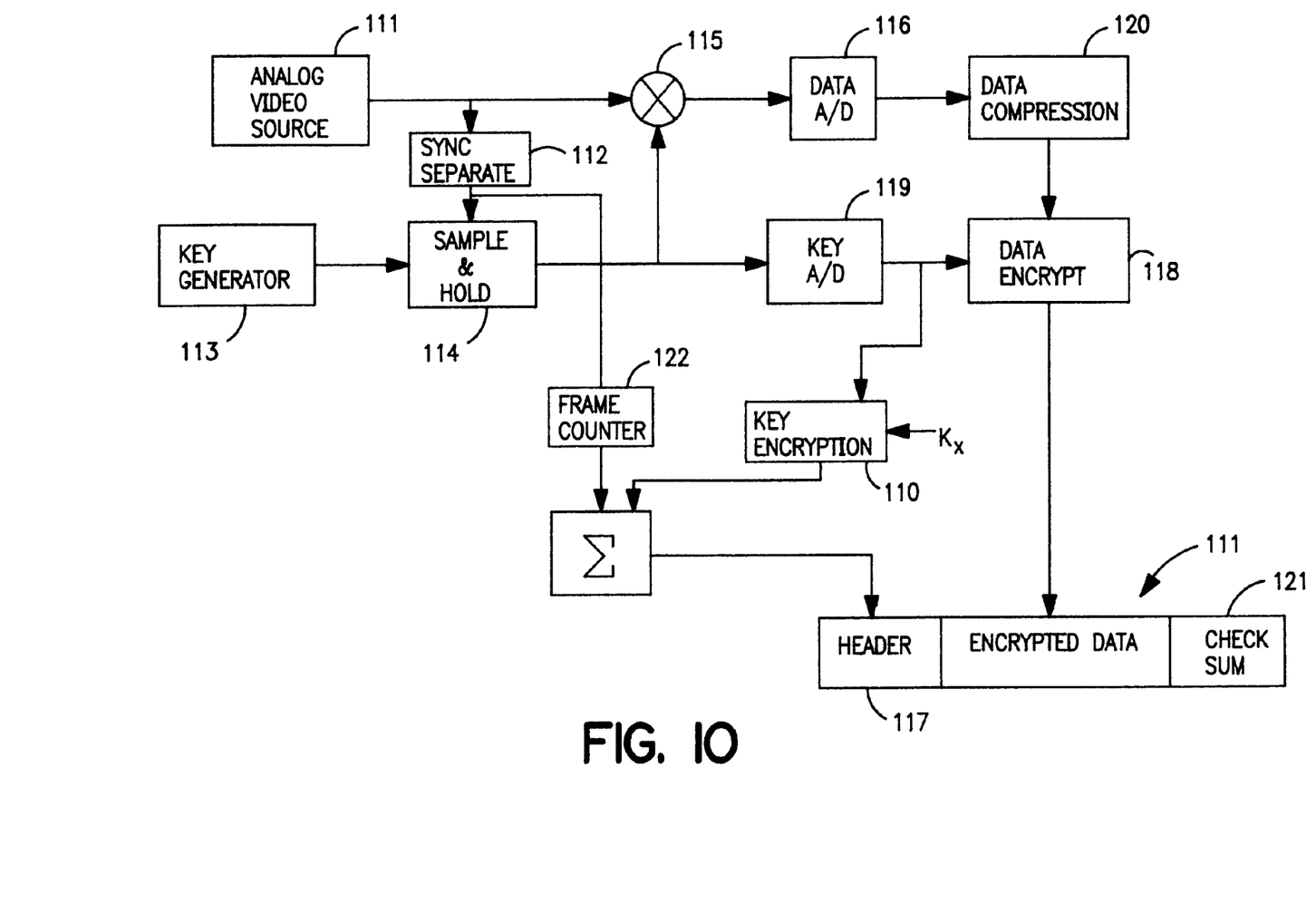
FIG. 10 is a block diagram illustrating an apparatus for preparing secure data for recording on a digital video disk.

Referring now to FIG. 10, a block diagram is shown of an embodiment of the device for creating a digital video disk master for use in creating subsequently recorded digital video disks for mass distribution. FIG. 10 contemplates a system for recording a source of original master analog video signals 111. The digital video disk 1 includes encrypted data on a line-by-line basis, having a header 117 and a check sum 121. The header 117 of the digital video disk includes a frame number corresponding to the particular line of video signal contained in the frame, as well as a key which is used to derive a decryption key for decrypting the encrypted data.

The recording system of FIG. 10 contemplates a key generator circuit 113 which may be a noise generator sampled at the beginning of each line of video signal by sample and hold circuit 114. A sync separator 112 operates to sample the noise signal from the key generator 113 at the beginning of each video line interval. The sampled noise is combined with the original line of video signal in a mixer/modulator 115. Thus, a composite signal comprising a sample of noise with the original line of video signal is prepared for data encryption.

The combined video and noise signal is converted to a digital quantity by A/D converter 116 and applied to a data compression circuit 120. The data compressed signal is then encrypted by a data encryption circuit 118.

A key for the data encryption circuit is created by the analog to digital converter 119 which creates a digital key from the sampled noise signal which was combined with the video signal for encrypting the data signal. The encrypted data from encryption circuit 118 is then written to the digital video disk.

In accordance with a preferred embodiment of the invention, the lower order bits of the key produced by A/D converter 119 are dropped before encrypting the data in data encryption circuit 118 and before adding the encrypted key to header 117. In this way, residual noise is left on the analog video output signal following the decryption of the data. Any attempt to copy the analog video output signal after decryption would tend to increase the noise, thus, making it an unsuitable master source for creating illicit copies of the recorded media.

The addition of the noise to each line of video makes unauthorized use of the disk 1 even more difficult. The noise remains in the recorded data stream, and even if a unauthorized party is successful in decrypting the data, the presence of the noise with the encrypted data makes it undesirable, if not unusable.

The header 117 includes a field with a frame count produced by the frame counter 122 which identifies the frame associated with the header. The header also includes in another field an encrypted version of the key used to encrypt the data. The key encryption circuit 110 encrypts the key with a value $K_X$ specific to the particular title being recorded on the digital video disk. The resulting encrypted value of the key and the frame count are inserted in the field of the header 117. It is also possible to include other pertinent data in the other fields of the header, such as synchronization information, etc.

Figure 11:
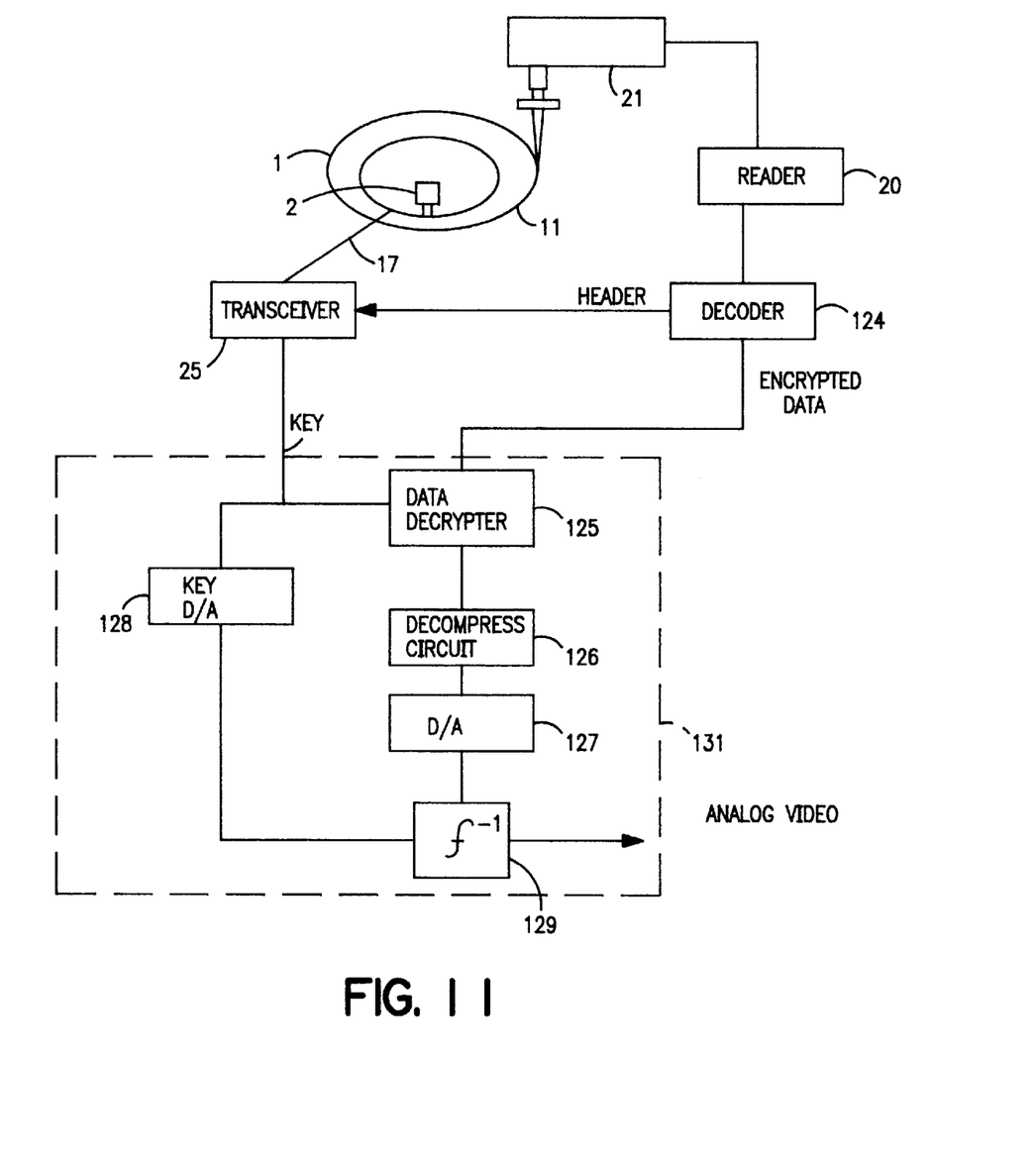
FIG. 11 is an illustration of the device for reading and decrypting the encrypted data on the video recording disk.

FIG. 11 illustrates one example of a apparatus which may be used to read the contents of the digital video disk 1, and decrypt the encrypted contents of each frame. As set forth in the previous embodiments, an optical scanning head 21 is used to read each frame from the record. The header 117 of the frame is decoded with decoder 124. The encrypted key $K_X$ and frame number i are forwarded via the transceiver 25 to a transponder located on the digital video disk. The transponder 2 includes a deciphering engine therein which, from the value of $K_X$ and i derives a decryption key $K_X D$. The decryption key is forwarded to the transceiver 25, and is available for decrypting the data contained in the frame.

The data decrypter 125 decrypts the data using the key and forwards the data to the decompression circuit 126. Decompression circuit 126 restores the data to its full width and applies the restored data to a digital to analog converter 127.

The derived key is also converted by digital to analog converter 128 to an analog signal for deriving a cancellation component for removing noise contained in the demodulated data stream. A subtractor/demodulator 129 demodulates the data using the analog version of the key to derive an analog output signal.

If the digital resolution of the key created in analog to digital converter 119 of FIG. 10 is less than the resolution of the analog to digital converter 116, residual noise will remain during recovery of the signal by the subtractor/demodulator 129. The residual noise constitutes an offset or modulation of the video signal which will effect the gray scale and color so that it is not identical to the original but not sufficient to be objectionable. However, the residual noise will make copying of the digital video disk commercially unattractive.

If the functional set of components within 131 is created in a single integrated circuit, the analysis of the system will be extremely difficult and reverse engineering the system will be uneconomical discouraging the manufacture of illicit copies.

Figure 12:
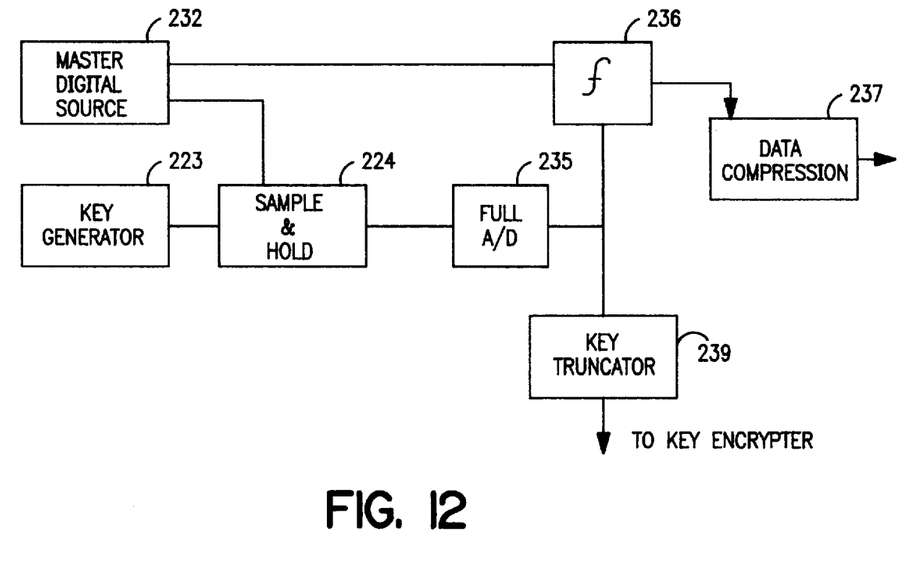
FIG. 12 is an alternative embodiment for encoding a source of digital signals.

The foregoing examples of a system for recording and reading encrypted data on a data media of FIGS. 10 and 11 can be implemented using a master digital source. FIG. 12 illustrates a recording system modified to encrypt data which originates from a digital source. The master digital source 232 generates each frame of data as a video line with a sync signal. The sync signal is used to sample and hold a value of noise produced by key generator 223 in a sample and hold circuit 224. The value of noise is digitized in an analog to digital converter 235 and combined in a digital adder 236 with the master digital source video line data. The digital adder 236 may be a multiplier, XOR circuit, or any digital device which can combine two digital signals. The analog to digital converter 235 may provide a digital key of the same width as the value of each pixel produced by the digital source 232. The digital key is truncated by a key truncator 239 to produce a low resolution key. As the case in the system of FIG. 10, the combined data is compressed with a data compression circuit 237.

Figure 13:
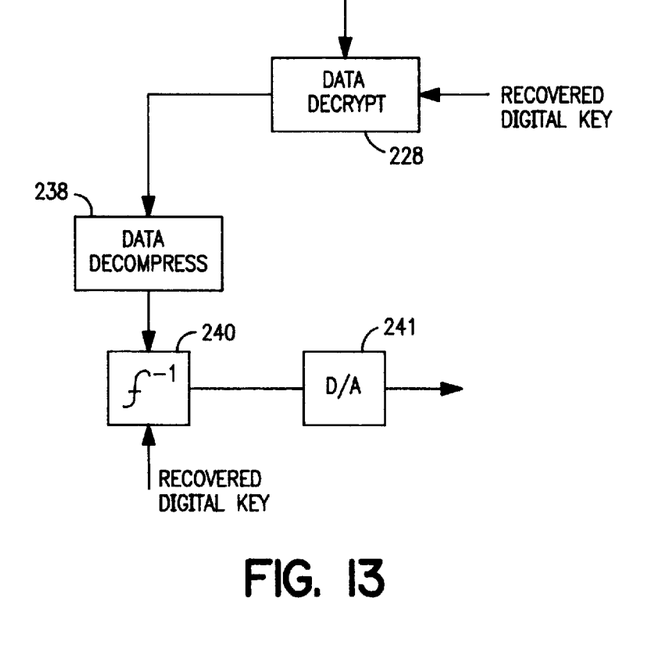
FIG. 13 is an illustration of a device for decrypting data which has been recorded on the digital video disk.

FIG. 13 shows a modification to the circuitry of FIG. 11 which will decrypt the information encoded on the digital video disk of the circuit of FIG. 12. The key recovered from the transponder 2 is used to decrypt the data in decryption circuit 228 as in the previous version of FIG. 11. The data is decompressed with a data decompression circuit 238 and then combined in inverse function circuit 240 having the inverse function of the digital adder 236 with the recovered digital key. The recovered digital key representing a noise component partially cancels noise contained in the decompressed data. Digital/analog converter 241 provides the final analog voltage of the recovered data. Security is enhanced by providing the devices of FIG. 13 in a single integrated circuit to avoid discovery of the encryption/decryption process.

It is a further enhancement to security if the device 236 for combining the digital key and data, and the inverse function circuit 240 are analog in character, i.e., they have certain non-linear responses and are inherently not noise free. In this way, it becomes more difficult to emulate their functions using any type of digital means, which might be utilized to produce an analog output signal having a quality capable of recording and reproduction.

Thus, there has been described with respect to one embodiment a system for securely storing data on a data medium. Those skilled in the art will recognize yet other embodiments described more particularly by the claims which follow.

What is claimed is:

1. A method for securely storing a series of frames of analog information which occur at a synchronous rate comprising:
    generating an analog noise signal;
    sampling said analog noise signal at said synchronous rate to produce a sample each frame;
    combining each sampled noise signal with said analog information signal of each frame to produce a combined signal;
    digitizing said combined signal;
    deriving a digital representation of said sampled analog noise signal;
    encrypting said digitized combined signal; and
    creating a plurality of frames of said encrypted digitized signal, each frame having a header with a frame identification field and said digital representation of said sampled noise signal; and
    storing said plurality of frames of said encrypted digitized signal on a data storage medium.

2. The method according to claim 1 further comprising:
    encrypting said digital representation of said sampled noise.

3. The method according to claim 1 further comprising:
    compressing said combined digitized signal.

4. The method according to claim 1 wherein said step of combining said analog information signal with said sampled noise signal is implemented by mixing said sampled noise signal with said analog information signal.

5. The method according to claim 1 wherein said frames of analog information signal are lines of a video signal, and said sampling is synchronized to the video signal line rate.

6. The method according to claim 1 further comprising generating a frame number based on a number of consecutive sampling intervals.

7. The method according to claim 6 further comprising inserting said frame number in said frame identification field.

8. The method according to claim 1 wherein said digital representation of said noise signal is encrypted before storing in said header.

9. A method for recovering analog information from a data medium comprising:
    reading digital data stored as frames on said data medium;
    deriving a key from data contained in each frame on said data medium derived from a noise component of said digital data;
    decrypting said digital data with said key;
    converting said digital data to an analog signal; and
    combining said key derived from a noise component with said analog signal to remove noise contained in said analog signal.

10. The method according to claim 9 further comprising:
    decompressing said digital data.

11. The method according to claim 9 wherein said key is converted to an analog quantity before it is combined with said analog signal.

12. An apparatus for securely storing analog information as occurring in frames at a synchronous rate comprising:
    a source of analog video signals comprising a synchronous sequence of frames;
    a sample and hold circuit, connected to operate in synchronism with said analog signal, said sample and hold circuit being connected to a noise generator for providing a sample of noise for each frame of the video signal;

means for combining the value of noise derived from said sample and hold circuit with each frame of said analog video signal;

means for converting said combined analog video signal and sample of noise signal to a digital signal;

means for converting said sample of noise signal into a digital encryption key;

means for encrypting said combined video signal and noise signal with said key forming a frame of encrypted data;

means for inserting a frame number and a value of said key in a header of a frame of said encrypted data; and means for storing each of said frames on the medium.

13. The apparatus of claim 12 further including a key encryption means for encrypting said key before inserting in said header.

14. A system for decrypting frames of encrypted video information stored on a recording medium comprising:

a reader circuit for reading each frame of stored video signals;

a decoder for recovering from a header on each read frame an encrypted key, and frame number;

means for deriving a decyrption key from said encrypted key and frame number;

means for decrypting information stored within said frame containing said encryption key with said decryption key;

means for converting said decryption key into an analog voltage;

means for converting said decrypted information into an analog voltage; and means for combining said analog voltages to produce an analog video signal.

15. The apparatus of claim 14 further comprising means for decompressing said decrypted data.

* * * * *